(12) United States Patent
Rains

(10) Patent No.: US 9,103,456 B1
(45) Date of Patent: Aug. 11, 2015

(54) DE-JAMMING DEVICE

(71) Applicant: Michael David Rains, Whittier, CA (US)

(72) Inventor: Michael David Rains, Whittier, CA (US)

( * ) Notice: Subject to any disclaimer, the term of this patent is extended or adjusted under 35 U.S.C. 154(b) by 0 days.

(21) Appl. No.: 14/336,713

(22) Filed: Jul. 21, 2014

Related U.S. Application Data

(60) Provisional application No. 61/959,208, filed on Aug. 19, 2013.

(51) Int. Cl.
*F16K 15/18* (2006.01)

(52) U.S. Cl.
CPC ...................................... *F16K 15/18* (2013.01)

(58) Field of Classification Search
CPC .............................. F16K 15/18; F16K 15/181
USPC ....................... 251/82, 83; 137/522, 527, 523
See application file for complete search history.

(56) References Cited

U.S. PATENT DOCUMENTS

| | | | | |
|---|---|---|---|---|
| 1,992,490 | A | * | 2/1935 | Lewis ........................... 239/572 |
| 2,285,324 | A | * | 6/1942 | Bennett ......................... 251/228 |
| 3,032,063 | A | * | 5/1962 | Wells ........................ 137/599.18 |
| 3,114,391 | A | * | 12/1963 | Kurtz ........................ 137/599.18 |
| 5,099,871 | A | | 3/1992 | Cowan |
| 5,306,122 | A | * | 4/1994 | Gebauer et al. ................ 417/383 |
| 6,149,125 | A | * | 11/2000 | Nilsson ........................... 251/82 |
| 7,540,721 | B2 | | 6/2009 | Liedtke |
| 8,413,674 | B2 | | 4/2013 | Chaffee |
| 2004/0219027 | A1 | | 11/2004 | Anderson |

* cited by examiner

*Primary Examiner* — John Bastianelli
*Assistant Examiner* — Andrew J Rost
(74) *Attorney, Agent, or Firm* — Eric Karich; Karich & Associates

(57) ABSTRACT

A de-jamming device has a tubular housing that defines a lumen having a lumen axis, a proximal end, and a distal end. The proximal end has a threaded valve attachment structure for threadedly attaching the de-jamming device to the check valve. A portal extends through the tubular housing in communication with the lumen, and a push rod is positioned through the portal and into the lumen such that the push rod can be pushed into the valve conduit for pushing open the sealing element of the check valve.

16 Claims, 4 Drawing Sheets

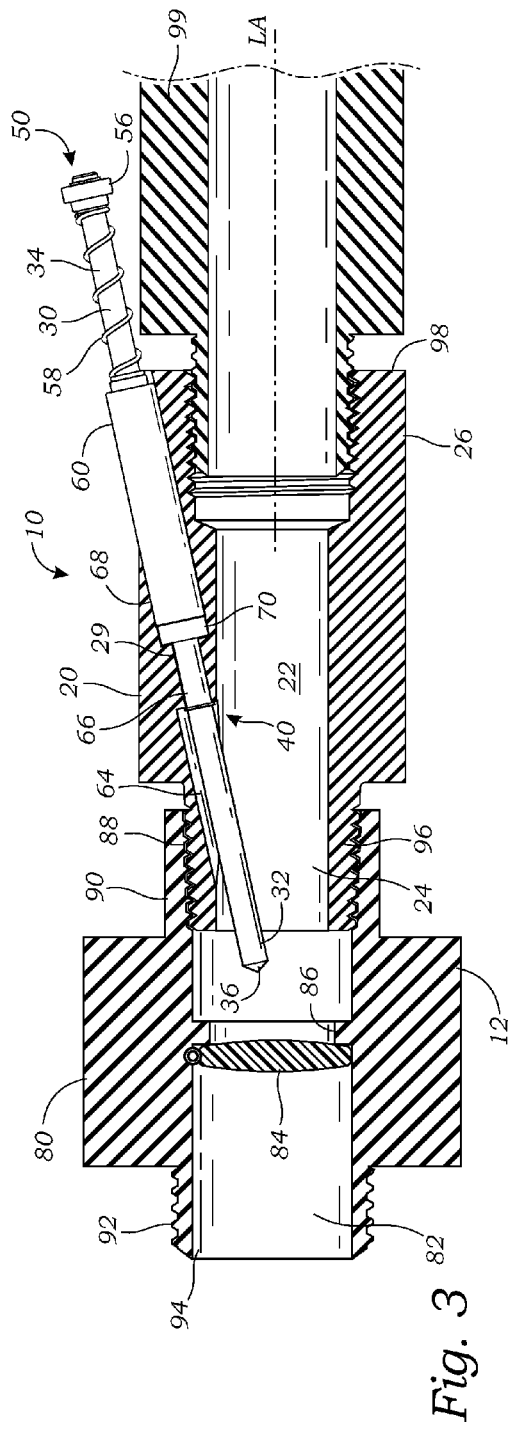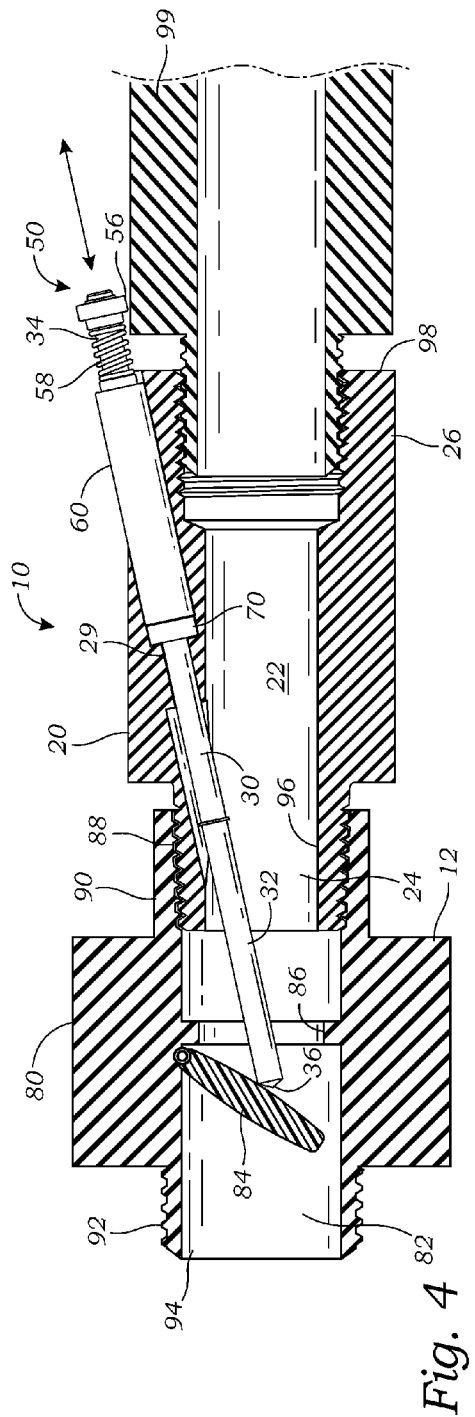

DE-JAMMING DEVICE

CROSS-REFERENCE TO RELATED APPLICATIONS

This application for a utility patent claims the benefit of U.S. Provisional Application No. 61/959,208, filed Aug. 19, 2013.

BACKGROUND OF THE INVENTION

1. Field of the Invention

This invention relates generally valves, and more particularly to a device for de-jamming a valve.

2. Description of Related Art

Plumbing check valves can become jammed closed by corrosion or other causes, preventing the flow of fluids through the valve. This is especially a problem in a marine environment, where marine life and/or corrosion adheres to valves, causing them to get stuck shut.

Currently, it is necessary to disconnect the plumbing adjacent the valve and manually open the valve. This is time consuming and access to the valve may be difficult. The prior art has not adequately solved this problem, and there is a long-felt need for a device to simplify de-jamming valves.

The prior art teaches some specialty valves that have built-in de-jamming mechanisms. Examples of this are shown in the following references:

Liedtke, U.S. Pat. No. 7,540,721, teaches a check valve used in a paint pump. The check valve includes an automatic release mechanism that including a solenoid connected to the check valve with a pusher element which momentarily displaces a moveable element such as a ball in the check valve to break any adhesion between the movable element and a valve seat. A control provides a single pulse of energy to the solenoid each time power is applied to the pump. The control includes an SCR connected between a full wave rectifier and a coil of the solenoid, with gate current removed from the SCR to commutate the SCR after a predetermined time interval after power is applied.

Chaffee, U.S. Pat. No. 8,413,674, teaches a similar self-sealing valve that is part of an inflatable device. The valve includes an electromechanical device including an actuating arm, having a first position in which the actuating arm urges open the self-sealing valve and a second position in which the actuating arm does not act upon the self-sealing valve, so as to regulate an amount of fluid within the inflatable device. With this arrangement, a small, low power, low duty cycle electromechanical device can be used. The actuator arm is biased by the electromechanical device to open the valve by acting on a portion of the valve.

Anderson, U.S. 2004/0219027, teaches a paint pump that includes a combined strainer and valve release structure. The valve release structure includes pushrod that extends to adjacent the valve, so that it may be used to dislodge the valve in the event that it becomes stuck.

Cowan, U.S. Pat. No. 5,099,871, teaches an unloading mechanism for unloading a pump system. The unloading mechanism includes a check valve that includes a valve actuator for forcing open the check valve to unload the system.

The prior art teaches specialty valves that include a de-jamming mechanism. However, the prior art does not teach a de-jamming device that is operably connected between a check valve and plumbing for enabling de-jamming of the check valve. The present invention fulfills these needs and provides further advantages as described in the following summary.

SUMMARY OF THE INVENTION

The present invention teaches certain benefits in construction and use which give rise to the objectives described below.

The present invention provides a de-jamming device for connection with a check valve and for de-jamming the check valve in the event that it becomes stuck. The de-jamming device includes a tubular housing that defines a lumen having a lumen axis, a proximal end, and a distal end, the proximal end having a threaded valve attachment structure for threadedly attaching the de-jamming device to the check valve. A portal extends through the tubular housing in communication with the lumen, and a push rod is positioned through the portal and into the lumen such that the push rod can be pushed into the valve conduit for pushing open the sealing element of the check valve.

A primary objective of the present invention is to provide a de-jamming device having advantages not taught by the prior art.

Another objective is to provide a de-jamming device that may be installed on a check valve for de-jamming the check valve if it becomes stuck.

A further objective is to provide the de-jamming device that is easy to use, and does not require disassembly of any plumbing associated with the valve.

Other features and advantages of the present invention will become apparent from the following more detailed description, taken in conjunction with the accompanying drawings, which illustrate, by way of example, the principles of the invention.

BRIEF DESCRIPTION OF THE DRAWINGS

The accompanying drawings illustrate the present invention. In such drawings:

FIG. 3 is a cross-sectional view of the de-jamming device operably connected between a check valve and plumbing, illustrating a push rod in a retracted position;

FIG. 4 is a cross-sectional view of the de-jamming device of FIG. 3, illustrating the push rod moved to an extended position.

DETAILED DESCRIPTION OF THE INVENTION

The above-described drawing figures illustrate the invention, a de-jamming device 10 for opening a check valve 12 that has become stuck closed.

Figure 1:
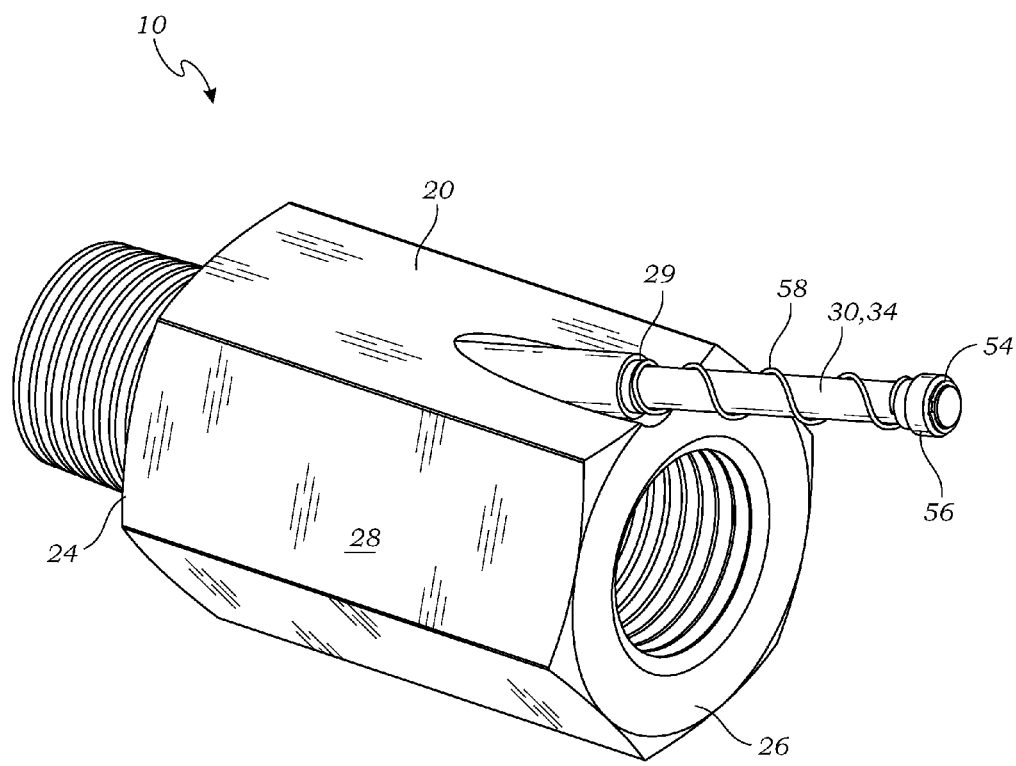
FIG. 1 is a perspective view of a de-jamming device according to one embodiment of the present invention.
Figure 2:
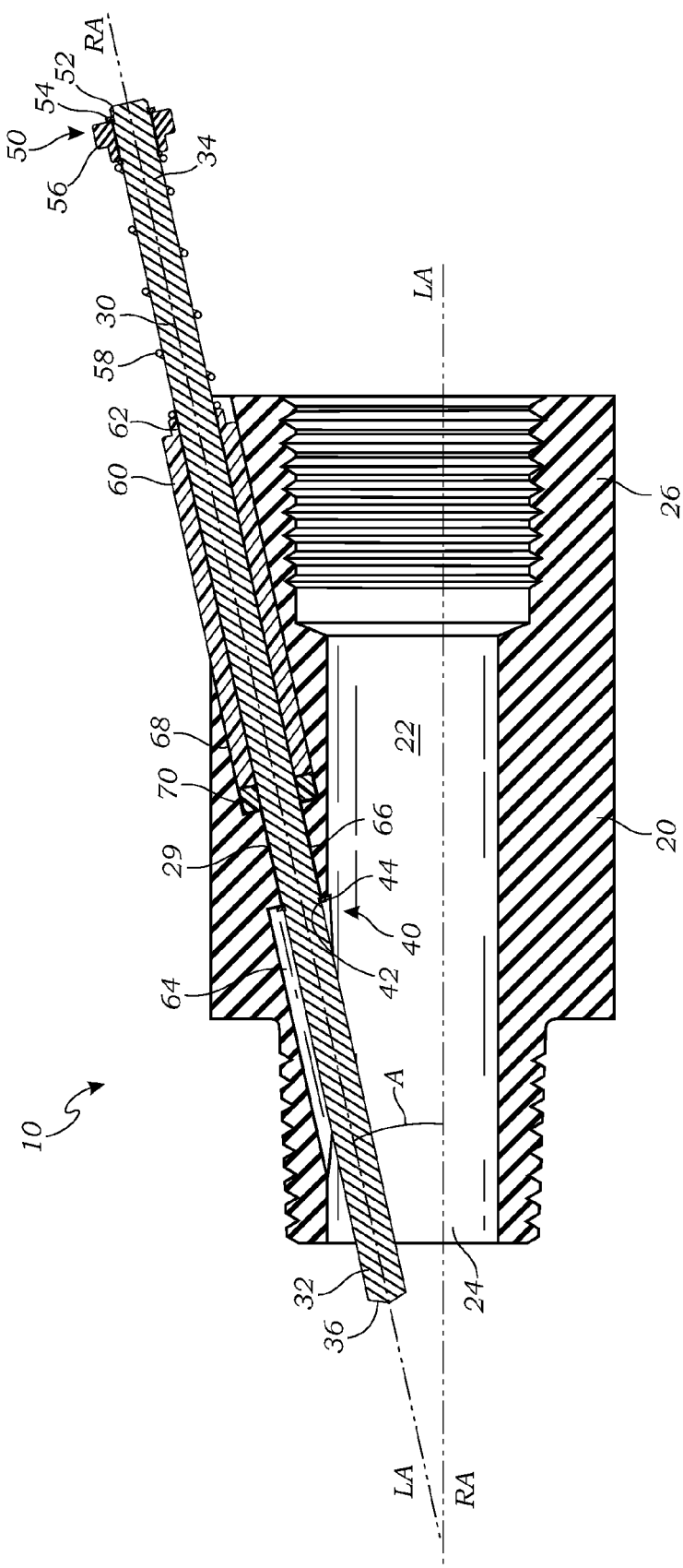
FIG. 2 is a side elevational cross-sectional view thereof.

FIG. 1 is a perspective view of the de-jamming device 10 according to one embodiment of the present invention. FIG. 2 is a side elevational cross-sectional view thereof. As shown in FIGS. 1-2, the de-jamming device 10 has a tubular housing 20 that defines a lumen 22 that transmits a flow of fluids between a proximal end 24 and a distal end 26. The lumen 22 has a lumen axis LA, extending from the proximal end 24 to the distal end 26, generally forming an axis of symmetry for the lumen 22 and the tubular housing 20. In the present embodiment, the tubular housing 20 has an outer surface 28 that has a hexagonal cross-section. In alternate embodiments, the outer perimeter may have another shape, e.g. square, round, or any shape desired by one skilled in the art.

As shown in FIGS. 1 and 2, a push rod 30 extends through a portal 29 of the tubular housing 20 and into the lumen 22. The push rod 30 may be actuated from outside the de-jamming device 10 to un-jam the check valve 12, as discussed in greater detail below. As shown in FIGS. 1 and 2, the push rod 30 may have a first end 32, nearest the proximal end 24 of the tubular housing 20, and a second end 34, nearest the distal end 26 of the tubular housing 20.

The push rod 30 has a rod axis RA that runs longitudinally along the center of the rod 30. The rod axis RA is at a rod angle A relative to the lumen axis LA. In one embodiment, the rod angle A is about 12.5 degrees. In alternate embodiments, the rod angle A may be any value or be varied within a specified range, e.g. about 5-20 degrees. In the present embodiment, the push rod 30 is an elongate solid rod of circular cross-section. In alternate embodiments, the push rod 30 may have any shape or cross section, e.g., round, square, hollow, or any kind of geometric construction desired by one skilled in the art. The length of the push rod 30 may vary to allow for different values of the rod angle A, to select any reach of the first end 32 of the push rod 30 into the check valve 12, or to have any length of push rod 30 between the second end 34 of the push rod 30 and the tubular housing 20.

The push rod 30 may also have a conical tip 36, having a conical tip 36 angle, located at the first end 32 of the push rod 30. The conical tip 36 is present to provide a less oblique contact surface for pushing against the check valve 12. This has the added benefit of preventing the formation of a lip, due to repeated contact with the check valve 12. Such a lip may cause the push rod 30 to catch against the check valve 12, and is best avoided. The conical tip 36 angle is defined as the angle between a line parallel to, and along the surface of, the conical tip 36, and a line perpendicular to the rod axis RA.

As shown in FIGS. 1 and 2, the push rod 30 may include a first stop element 40 located near the first end 32 of the push rod 30, and a second stop element 50 located near the second end 34 of the push rod 30. The first stop element 40 has a diameter larger than the portal 29, such that the first end 32 of the push rod 30 cannot be pulled through the portal 29; and the second stop element 50 has a diameter larger than the portal 29, such that the first end 32 of the push rod 30 cannot be pulled through the portal 29.

In the embodiment of FIGS. 1 and 2, the first stop element 40 includes a first annular receiving notch 42 located near the first end 32 of the push rod 30, and a first annular locking ring 44 lockingly engaged with the first annular receiving notch 42. The first annular locking ring 44 is larger than the portal 29 so that the first end 32 cannot be pulled through the portal 29. As with the first stop element 40, the second stop element 50 of this embodiment includes a second annular receiving notch 52 located near the second end 34 of the push rod 30, and a second annular locking ring 54 lockingly engaged with the second annular receiving notch 52.

The first and second annular receiving notches 42 52 may be any manner of notch, divot, recess, structure, or other receiving space for the first annular locking ring 44, and the locking rings may be any form of snap ring, C-shaped element, pin, or any other element that locks into or with the notches, as shown herein, or any equivalent manner.

As shown in FIGS. 1 and 2, a spring retainer 56 may be mounted on and/or attached to the second end 34 of the push rod 30, to retain a biasing element 58 on the push rod 30, between the spring retainer 56 and the rod guide 60, and/or provide a structure with which the biasing element 58 may engage when the biasing element 58 is undergoing compression. The biasing element 58 is described in greater detail below. In the present embodiment, the spring retainer 56 is in the form of an annular ring or nut surrounding the push rod 30. The spring retainer 56 may slide freely on the push rod 30, or it may optionally be threadedly engaged with the second end 34 of the push rod 30, in which case the second annular locking ring 54 and notch may be optional, or both may be included, or replaced with alternative and/or equivalent structures.

While one embodiment of the first and second stop elements 40 50 are shown in FIGS. 1 and 2, other structures may be used to prevent the removal of the push rod 30 from the de-jamming device 10, e.g. an E-ring, retaining ring, a flange, pin, nut, or any sort of annular device or otherwise that may be designed by one skilled in the art.

In the embodiment of FIGS. 1 and 2, a rod guide 60 extends at least partially through the tubular housing 20, such that a channel 62 of the rod guide 60 forms at least part of the portal 29 shaped to accept the push rod 30 therethrough. In the present embodiment, the rod guide 60 is an elongate tube that frictionally engages the tubular housing 20. In alternate embodiments, the rod guide 60 and the channel 62 may be any shape, e.g. round, square, hexagonal, or any shape desired by one skilled in the art, and may engage the tubular housing 20 in any manner known in the art (e.g., threadedly, with an adhesive, etc.).

In the embodiment of FIGS. 1 and 2, the portal 29 may also be divided into three sections, a transition section 64, a transmission section 66, and a guide section 68. The transition section 64 is the section of the portal 29 which merges with the lumen 22. The transition section 64 may be adjacent to transmission section 66, and may have a transition radius that is larger than the diameter of the push rod 30, so as to provide room for the first stop element 40. In alternate embodiments, the transition radius may be any size that is large enough the accommodate the push rod 30, or larger. The transmission section 66 is the part of the portal 29 which is completely within the tubular housing 20, between the transition section 64 and the guide section 68. The transmission section 66 has a diameter shaped to slidingly receive the push rod 30 therethrough.

In this embodiment, the guide section 68 is the part of the portal 29 which extends from outside the tubular housing 20 into the tubular housing 20, adjacent to transmission section 66, and may have a diameter shaped to accept the rod guide 60, as discussed above. In the present embodiment, this radius is larger than the radius of the transmission section 66, as the guide section 68 must accommodate the rod guide 60, as described above.

As shown in FIGS. 1 and 2, a resilient seal 70 may be positioned within the guide section 68 for forming a seal between the push rod 30 and the tubular housing 20. The resilient seal 70 may be of annular construction, such as an O-ring, while in other embodiments, the resilient seal 70 may be any sort of sealing element 84, mechanical seal, or any kind of seal desired by one skilled in the art. The rod guide 60 may engage the tubular housing 20 to compress the resilient seal 70, thereby further sealing the resilient seal 70 against the push rod 30. In the present embodiment, the rod guide 60 is pushed down the guide section 68, towards the resilient seal 70, where the longitudinal compression of the resilient seal 70 causes the resilient seal 70 to expand, or attempt to expand, along the radial direction relative to the rod axis RA, increasing the contact force between the push rod 30 and the tubular housing 20.

FIG. 3 is a cross-sectional view of the de-jamming device 10 once it has been operably installed between the check valve 12 and plumbing. As shown in FIG. 3, the check valve 12 is of standard construction, and has a valve housing 80 that defines a valve conduit 82. A sealing element 84 is operably mounted within the valve conduit 82 for contacting a seat 86 for selectively sealing the valve conduit 82, of a construction that is well known in the art. The valve housing 80 has a first threaded opening 88 formed around a first valve end 90, and a second threaded opening 92 formed around a second valve end 94.

The de-jamming device 10 includes a valve attachment structure 96 formed in the proximal end 24 of the tubular housing 20 for operably attaching the de-jamming device 10 to the check valve 12. In the present embodiment, the valve attachment structure 96 may include threading that threadedly engages the first threaded opening 88 of the check valve 12. In this case the valve attaching structure 96 includes external threads; however, it may alternatively use internal threads, whichever embodiment is suitable for the check valve 12 to which it is being attached. The valve attachment structure 96 may alternatively have any shape or structure to allow for coupling to the check valve 12, e.g. notching, clamps, compression fitting, locking posts, or any other structure desired by one skilled in the art.

As shown in FIG. 3, the de-jamming device 10 may also include a plumbing attachment structure 98 formed in the distal end 26 of the de-jamming device 10 for operably attaching the de-jamming device 10 to the plumbing 99. In the present embodiment, the plumbing attachment structure 98 may include plumbing attachment threading, in this case an internal thread, for threadingly coupling to the plumbing 99. The plumbing attachment structure 98 may have any shape or design to allow for coupling to the plumbing 99 section, as discussed above.

As discussed above, the valve attachment threading of this embodiment is external threading, and the plumbing attachment threading is internal threading; however, the gender/type of valve attachment structure 96 and the plumbing attachment structure 98 may be male/external, or female/internal, and of any equivalent construction, as desired by one skilled in the art, to couple to any gender or fitting type of check valve 12 or plumbing 99 section to the de-jamming device 10.

FIG. 4 is a cross-sectional view of the de-jamming device 10 of FIG. 3, illustrating the push rod 30 moved to an extended position. As shown in FIGS. 3-4, the push rod 30 may slide between the retracted position (shown in FIG. 3), wherein the push rod 30 does not contact the sealing element 84 of the check valve 12, and an extended position (shown in FIG. 4), wherein the first end 32 of the push rod 30 extends out of the proximal end 24 of the tubular housing 20 for forcing the sealing element 84 of the check valve 12 open.

The biasing element 58 biases the push rod 30 towards the retracted position, shown in FIG. 3, wherein the first end 32 of the push rod 30 is within or adjacent the proximal end 24 of the tubular housing 20. In the present embodiment, the biasing element 58 is a spring, coiled around the push rod 30, and compressed when the push rod 30 moves longitudinally towards the extended position shown in FIG. 4. In alternate embodiments, the biasing element 58 may be another form of spring or similar mechanism, e.g. another form of spring, resilient element, pneumatic chamber, or any other sort of position restoring device known by one skilled in the art.

The extended position may be realized by imparting a force on the push rod 30 and along the push rod axis RA towards the check valve 12, causing the push rod 30 to slide through the portal 29 until the first end 32 of the push rod 30 contacts the sealing element 84 of the check valve 12. The pressure on the sealing element 84 of the check valve 12 12 can then force the check valve 12 open, in the event that it is ever stuck closed. The act of forcing the check valve 12 open may restore operation of the check valve 12. After the check valve 12 is open, the push rod 30 returns to the retracted position under the bias of the biasing element 58.

Figure 5:
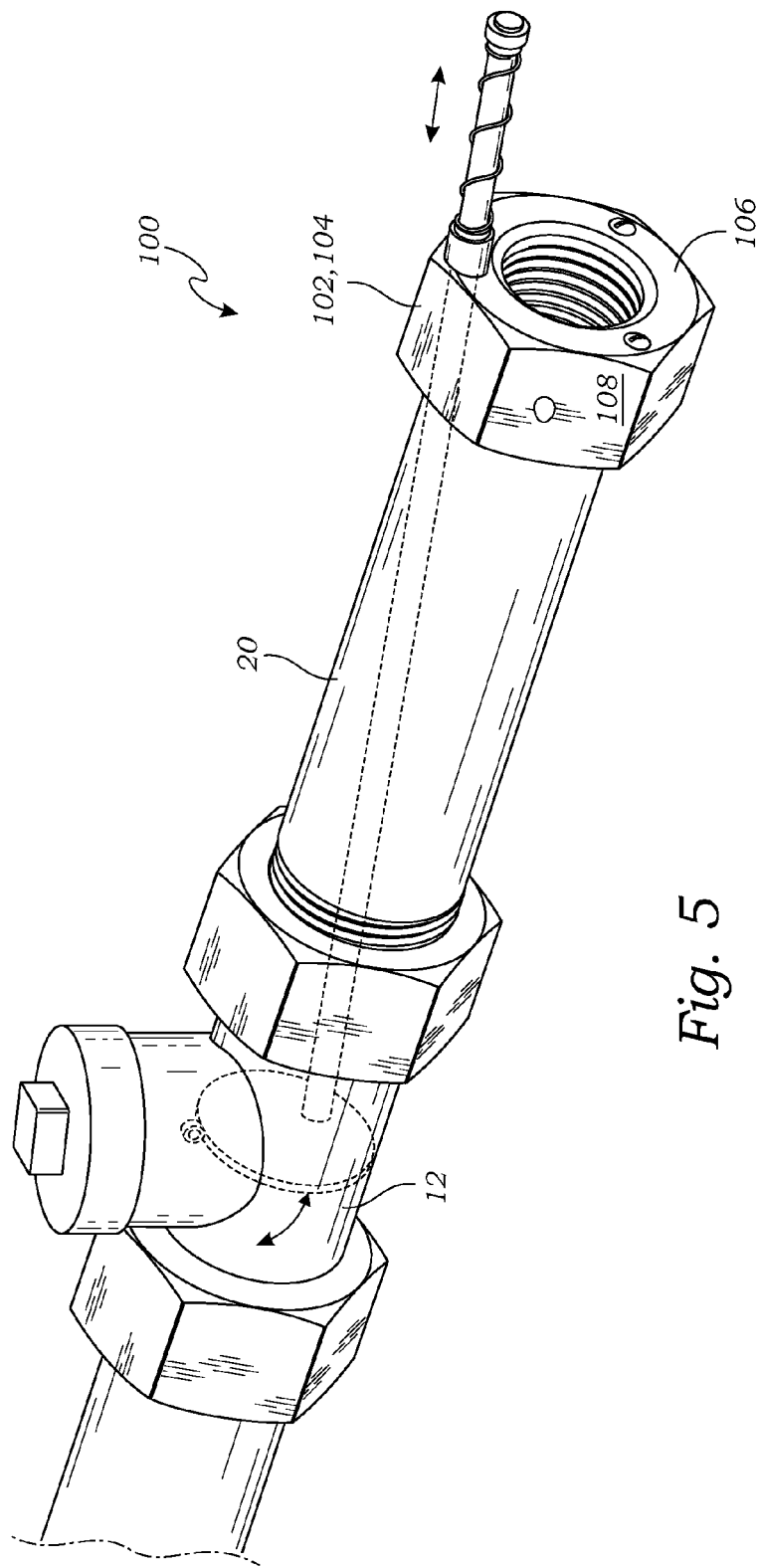
FIG. 5 is a perspective view of a second embodiment of the de-jamming device.

FIG. 5 is a perspective view of a second embodiment of the de-jamming device 100. As shown in FIG. 5, in the second embodiment of the de-jamming device 100, the push rod 30 is positioned through the tubular housing 20 at the distal end 102, through a head 104 formed around the distal end 102 of the tubular housing 20. The head 104 may have a face 106, transverse to the lumen axis LA, which may function as the terminal surface of the de-jamming device 10 at the distal end 102. In the present embodiment, the portal 29 is through the face 106 and in communication with the lumen 22. The head 104 may have a planar side 108, parallel to the lumen axis LA, where such a planar side 108 may be more easily grasped by a tool. In the present embodiment, the head may have six planar sides 108, arranged to give the head 104 a hexagonal outer perimeter.

As used in this application, the term "about," in the context of discussing numerical values or ranges, is hereby defined to include a variation of +/−10% of the specified value of the numerical value in question, or the endpoints of the stated range. Such variation is expected as a natural result of imperfections in manufacturing, assembly, etc.

As used in this application, the words "a," "an," and "one" are defined to include one or more of the referenced item unless specifically stated otherwise. Also, the terms "have," "include," "contain," and similar terms are defined to mean "comprising" unless specifically stated otherwise. Furthermore, the terminology used in the specification provided above is hereby defined to include similar and/or equivalent terms, and/or alternative embodiments that would be considered obvious to one skilled in the art given the teachings of the present patent application.

What is claimed is:

1. A de-jamming device for connection with a check valve for de-jamming the check valve in the event that it becomes stuck, the check valve having a valve housing that defines a valve conduit, a sealing element operably mounted within the valve conduit for selectively sealing the valve conduit, and a first threaded opening formed around a first valve end of the valve housing, around the valve conduit, the de-jamming device comprising:

a tubular housing that defines a lumen having a lumen axis, the tubular housing having a proximal end and a distal end;

a threaded valve attachment structure formed in the proximal end of the tubular housing for threadedly attaching the de-jamming device to the first threaded opening of the check valve so that the lumen of the tubular housing is in fluid communication with the valve conduit;

a portal through the tubular housing in communication with the lumen; and a push rod positioned through the portal such that a first end extends into the lumen and a second end remains outside of the tubular housing, wherein the push rod slides between a retracted position wherein the first end of the push rod is within or adjacent the proximal end of the tubular housing of the de-jamming device, and an extended position wherein the first end of the push rod extends out of the proximal end of the tubular housing of the de-jamming device, through the first threaded opening of the check valve, and into the valve conduit for pushing open the sealing element of the check valve.

2. The de-jamming device of claim 1, wherein an outer surface of the tubular housing has a hexagonal cross-section.

3. The de-jamming device of claim 1, further comprising a plumbing attachment structure formed in the distal end of the tubular housing for operably attaching the de-jamming device to a plumbing section.

4. The de-jamming device of claim 3, wherein the plumbing attachment structure includes plumbing attachment threading for threadingly coupling to the plumbing section.

5. The de-jamming device of claim 1, further comprising a head formed around the distal end of the tubular housing, the head comprising:
   a planar side, parallel to the lumen axis; and
   a face, transverse to the lumen axis, wherein the portal is through the face and in communication with the lumen.

6. The de-jamming device of claim 1, wherein the push rod extends along a rod axis that is about 12.5 degrees from the lumen axis.

7. The de-jamming device of claim 1, further comprising:
   a first stop element located near the first end of the push rod, the first stop element having a diameter larger than the portal, such that the first end of the push rod cannot be pulled through the portal; and
   a second stop element located near the second end of the push rod, the second stop element having a diameter larger than the portal, such that the first end of the push rod cannot be pulled through the portal.

8. The de-jamming device of claim 7, wherein the first stop element includes a first annular receiving notch located near the first end of the push rod, and a first annular locking ring lockingly engaged with the first annular receiving notch, the first annular locking ring being larger than the portal so that the first end cannot be pulled through the portal; and
   wherein the second stop element includes a second annular receiving notch located near the second end of the push rod, and a second annular locking ring lockingly engaged with the second annular receiving notch, the second annular locking ring being larger than the portal so that the second end cannot be pulled through the portal.

9. The de-jamming device of claim 7, further comprising a biasing element positioned between the second stop element and the tubular housing for biasing the push rod towards the retracted position.

10. The de-jamming device of claim 9, wherein the biasing element is a spring.

11. The de-jamming device of claim 1, wherein the portal is formed at least in part by a rod guide shaped to fit into the tubular housing, wherein the rod guide has a channel shaped to slidingly engage the push rod.

12. The de-jamming device of claim 11, wherein the tubular housing includes:
   a transition section, having a transition radius and a portal transition face, wherein the portal transition is the part of the portal which merges with the lumen;
   a transmission section having a transmission diameter, the transmission section coaxially aligned with, and adjacent to, the transition section, and shaped to accept the push rod; and
   a guide section having a guide radius, the guide section coaxially aligned with, and adjacent to, the transmission section, and shaped to accept the rod guide.

13. The de-jamming device of claim 12, further comprising a resilient seal within the guide section adjacent the transmission section for forming a seal between the push rod and the tubular housing.

14. The de-jamming device of claim 13, wherein the rod guide frictionally engages the tubular housing to compress the resilient seal against the transmission section of the tubular housing.

15. A combination check valve and de-jamming device comprising:
   a check valve having a valve housing that defines a valve conduit, a sealing element operably mounted within the valve conduit for selectively sealing the valve conduit, and a first threaded opening formed around a first valve end of the valve housing, around the valve conduit;
   a tubular housing that defines a lumen having a lumen axis, the tubular housing having a proximal end and a distal end;
   a threaded valve attachment structure formed in the proximal end of the tubular housing that is threadedly attached to the first threaded opening of the check valve so that the lumen of the tubular housing is in fluid communication with the valve conduit;
   a portal through the tubular housing in communication with the lumen; and
   a push rod positioned through the portal and into the lumen, wherein the push rod slides between a retracted position wherein a first end of the push rod is within or adjacent the proximal end of the tubular housing of the de-jamming device, and an extended position wherein the first end of the push rod extends out of the proximal end of the tubular housing of the de-jamming device, through the first threaded opening of the check valve, and into the valve conduit to pushing open the sealing element of the check valve.

16. A method for de-jamming a check valve, the method comprising the steps of:
   providing a de-jamming device comprising:
      a tubular housing that defines a lumen having a lumen axis, the tubular housing having a proximal end and a distal end;
      a threaded valve attachment structure formed in the proximal end of the tubular housing;
      a portal through the tubular housing to the lumen; and
      a push rod positioned through the portal and into the lumen;
   threadedly connecting the threaded valve attachment structure of the proximal end of the tubular housing of the de-jamming device to the check valve so that the lumen of the tubular housing is in fluid communication with the check valve;
   operably connecting the distal end of the tubular housing to plumbing, so that the plumbing is in fluid communication with the check valve through the de-jamming device;
   pushing against the push rod to extend the push rod from a retracted position to an extended position, such that the push rod extends out of the proximal end of the tubular housing of the de-jamming device, through the first threaded opening of the check valve, and into the valve conduit to pushing open the sealing element of the check valve, and pushes open a sealing element of the check valve.

\* \* \* \* \*